July 27, 1965

JAMES E. WEBB
ADMINISTRATOR OF THE NATIONAL AERONAUTICS
AND SPACE ADMINISTRATION
MEANS FOR VISUALLY INDICATING FLIGHT PATHS OF VEHICLES
BETWEEN THE EARTH, VENUS AND MERCURY 3,196,558

Filed May 16, 1963

INVENTOR.
JOHN G. SMALL
BY
*J. W. O'Brien*
*D. C. Keaveney*
ATTORNEYS

July 27, 1965

JAMES E. WEBB
ADMINISTRATOR OF THE NATIONAL AERONAUTICS
AND SPACE ADMINISTRATION
MEANS FOR VISUALLY INDICATING FLIGHT PATHS OF VEHICLES
BETWEEN THE EARTH, VENUS AND MERCURY 3,196,558

Filed May 16, 1963

INVENTOR.
JOHN G. SMALL
BY
ATTORNEYS

United States Patent Office 3,196,558
Patented July 27, 1965

3,196,558
MEANS FOR VISUALLY INDICATING FLIGHT PATHS OF VEHICLES BETWEEN THE EARTH, VENUS AND MERCURY
James E. Webb, Administrator of the National Aeronautics and Space Administration, with respect to an invention of John G. Small
Filed May 16, 1963, Ser. No. 281,069
1 Claim. (Cl. 35—45)

This invention relates to means for visually indicating flight paths of vehicles between the Earth, Venus and Mercury and the principal object of this invention is to provide a means in the form of a table structure representative of the solar system in the region including the Earth, which is contoured to cause gravitational movement of a spherical object toward the center of the table in scaled correspondence with the gravitational effect of the Sun on a space vehicle in the represented region of the solar system, and whereby magnets are moved in circular paths in scaled correspondence to the planets Venus and Mercury to simulate the gravitational field of these plants on an object passing nearby, and wherein means is provided to initiate movement of a magnetic ball on said table in a path and at a scaled velocity from a point representative of the Earth, thereby to represent the flight path of a space vehicle.

A further object is to provide a means whereby flight paths of space vehicles moving from the Earth to other planets may be visually represented to aid in understanding the mathematical and related problems of space flight.

With the above and other objects in view as may appear hereinafter, reference is directed to the accompanying drawings, in which.

Figure 1:
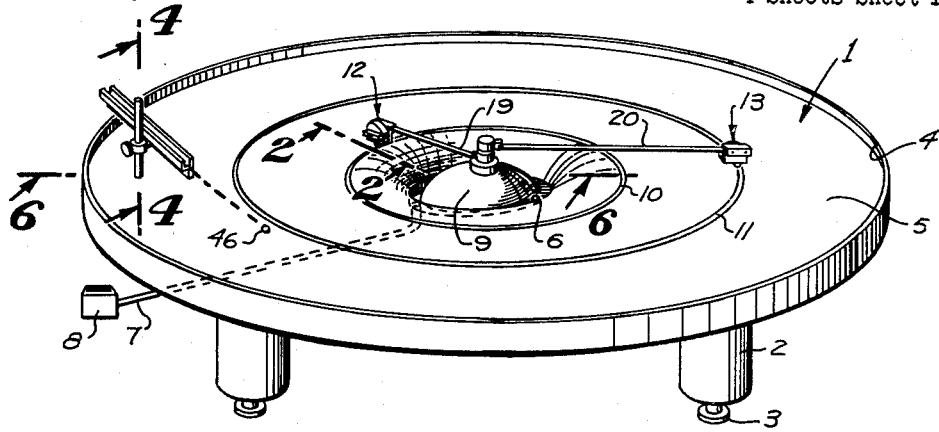
FIGURE 1 is a perspective view of a table structure embodying the invention.
Figures 2, 3, 4:
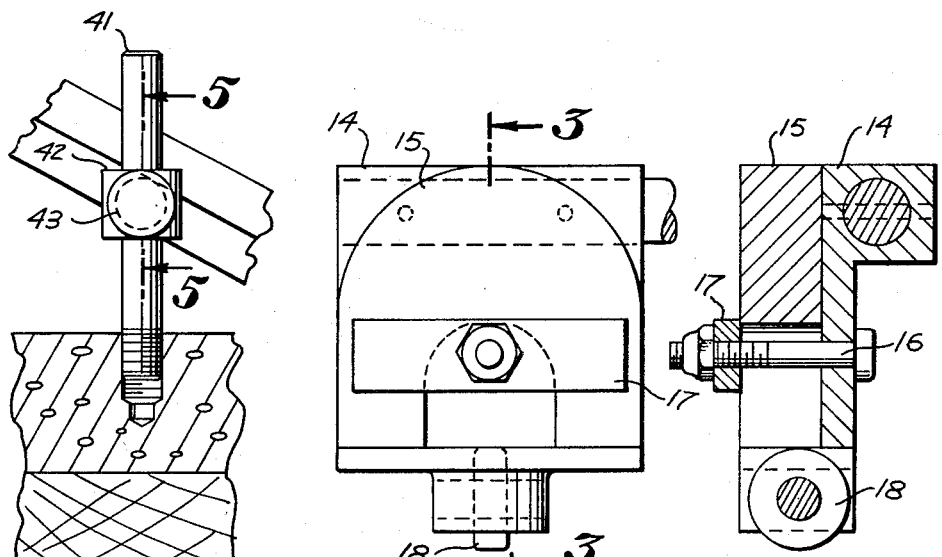
FIGURE 2 is an enlarged elevational view of one of the planet-representing structures taken from 2—2 of FIGURE 1.
FIGURE 3 is a sectional view thereof taken through 3—3 of FIGURE 2.
FIGURE 4 is an enlarged fragmentary sectional view taken through 4—4 of FIGURE 1, showing particularly the launching means for the space vehicle-representing member.
Figure 5:
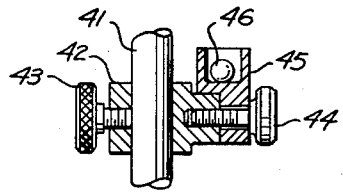
FIGURE 5 is a fragmentary sectional view thereof taken through 5—5 of FIGURE 4.
Figure 6:
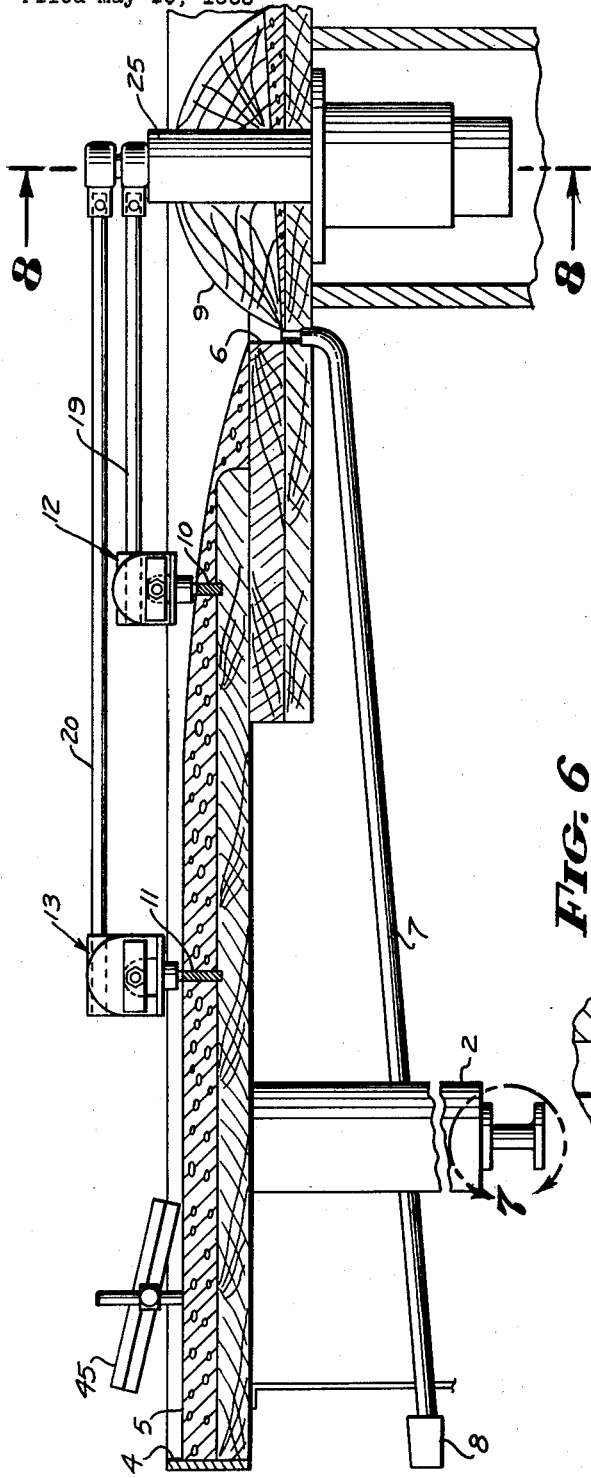
FIGURE 6 is an enlarged fragmentary sectional view taken through 6—6 of FIGURE 1 showing the planet-representing structures in alignment with the launching means disposed at a location representing the Earth.
Figure 7:
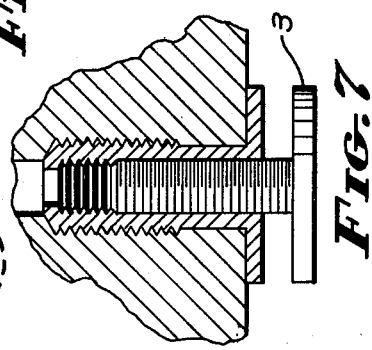
FIGURE 7 is an enlarged fragmentary sectional view taken within circle 7 of FIGURE 6.
Figure 8:
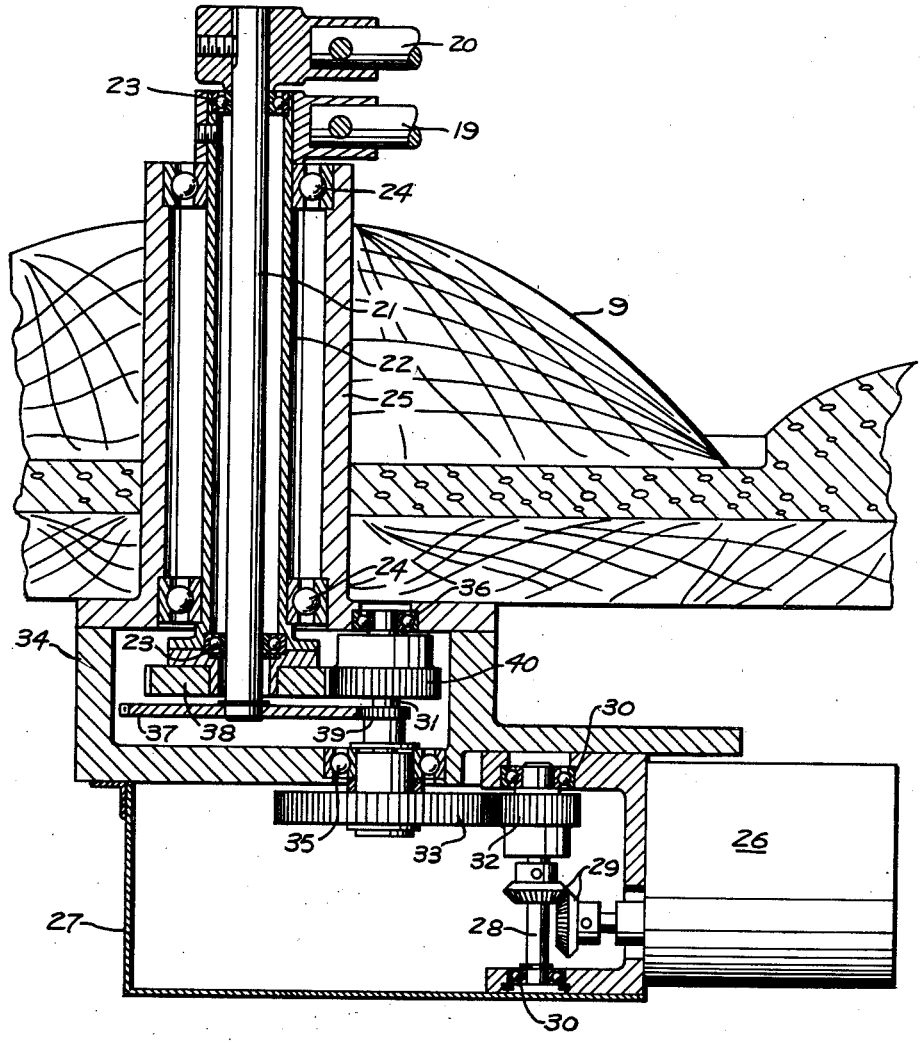
FIGURE 8 is a fragmentary sectional view taken through 8—8 of FIGURE 6.

The means for visually indicating flight paths of vehicles between the Earth, Venus and Mercury, includes a table 1 supported on legs 2 having adjustable feet 3 so that the table may be supported in a level condition. The table is provided with a marginal rim 4 and is provided with an upper surface 5 which slopes inwardly toward the center of the table, the degree of slope increasing toward the center. The sloping surface 5 terminates in a circular collector channel 6, the surface of which is inclined to provide a low point which communicates with a return tube 7 disposed under the table and which terminates in a receptacle 8.

The central portion of the table within the collector channel 6 is in the form of a dome 9 and represents the Sun. Set into the surface of the table 1 are circular tracks 10 and 11 representing, respectively, the path of travel of the planet Mercury and the planet Venus. It should be recognized that the circular tracks 10 and 11 are approximations of the paths of Mercury and Venus for the actual paths of these planets are slightly eccentric and are in slightly different planes.

Arranged for rotation on the tracks 10 and 11 are planet-representing structures 12 and 13 which correspond to the planets Mercury and Venus. Each structure includes a frame 14 having a vertical portion on one side of which is mounted a magnet 15 held in place on the frame by a bolt 16 and retainer bar 17. The poles of the magnet 15 are directed downward and carried by the frame 14. Between the poles of the magnet is a wheel 18 arranged to ride on the corresponding track 10 or 11.

Arms 19 and 20 extend horizontally from the planet-representing structures 12 and 13 respectively. The arm 20 is joined to a shaft 21 located at the center of the table and projecting above the dome 9. The arm 19 is joined to the upper end of a sleeve 22 supported in concentric relation with the shaft 21 by bearings 23. The sleeve 22 is supported by bearings 24 within a journal sleeve 25 projecting through the dome 9 and extending below the table 1.

Disposed below the table 1 is a motor 26 having a horizontal shaft which extends into a first housing 27 and is connected to a vertical shaft 28 by beveled gears 29. The ends of the shaft 28 are supported in bearings 30 within the housing 27 and are connected to a counter shaft 31 by means of spur gears 32 and 33. The counter shaft 31 extends into a second housing 34 having a wall common to the first housing 27. The counter shaft is supported on bearings 35 and 36.

The lower ends of the shaft 21 and sleeve 22 project into the second housing 34 and are provided with gears 37 and 38 respectively, which, in turn, mesh with gears 39 and 40 mounted on the counter shaft 31. The gear pairs 37 and 39 and 38 and 40 are so selected that the planet-representing structures 12 and 13 rotate about the Sun-representing dome 9 at speeds proportional to the rates of rotation of the planets Mercury and Venus.

Located at a fixed position representing a point in the orbit of the Earth, is a post 41 which projects upwardly from the surface of the table 1. A collar 42 is rotatably and vertically adjustable on the post 41 and is adapted to be locked in position by a set screw 43. A horizontal set screw 44 extending radially from the collar 42 serves to pivotally support a channel track 45. By reason of the adjustment afforded by the collar 42 and the set screws 43 and 44, the channel track may point in any direction about the axis of the post 41 and may be disposed at various inclinations.

A space vehicle-representing member in the form of a magnetic ball 46 is adapted to be launched by gravity along the channel track 45 so as to roll toward the center of the table.

In simulating the gravitational pull of the planets on the ball 46 at the time ball is launched from the channel track 45, the gravitational pull of the planets is provided by the magnets 15 mounted on the structures 12 and 13. For example, the Earth's orbit around the Sun is approximately 93-million miles while that of Venus is 67-million miles and Mercury is 36-million miles. Therefore, suppose the gravitational pull of the Earth upon the ball 46 has a value of 1.00 then the gravitational pull for the planet Mercury would be .38 while that for Venus be .85 and the gravitational pull of the Sun would be 27.89.

Using a standard ALNICO magnet sold by Crucible Steel Company it has been found that if the Earth were represented by a magnet it would be Crucible magnet #MA1078; while that representing the planet Venus would be #MA1077; and that for the planet Mercury or for planet Mars, which would have the same gravitational pull of .38, would be #MA1075.

The gravitational pull of the Sun on the ball 46 being 27.89 as compared with the pull of the Earth of 1.00 is not simulated in this disclosed embodiment by a magnet but by providing the proper slope to the surface 5 of table 1. Thus, the ball 46 will be attracted toward the center of the table 1 due to the Earth's normal gravitational pull on the ball 46 as hereinafter described.

Figure 9:
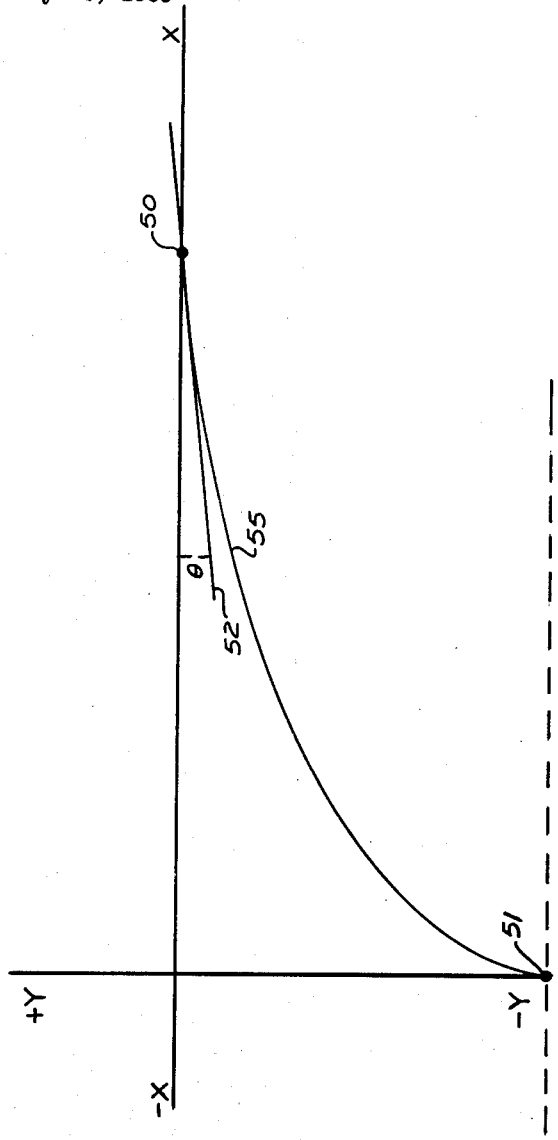
FIGURE 9 is a graphic plot of the sloping surface of the table.

With reference to FIGURE 9 the contour of the table surface 5 is graphically represented by the curve 55 between points 50 and 51. The angle $\theta$ is the angle between the horizontal axis X and a straight line 52 tangent to curve 55 at point 50. It has been found by experimentation that the inclination of line 52 with respect to the horizontal axis X at point 50 must be .026 (the tangent of the angle $\theta$) in order for the ball 46 to roll toward the center of the table when it leaves the ramp 45 at near zero velocity.

This value of .026 can also be used to represent $$\frac{dy}{dx}$$

in the following equations for determining the X and Y coordinate for the points along the curve 55 as follows:

$$Y = \frac{K}{X^2}$$

where X and Y are the coordinates and K is the gravitational constant representing the pull on the ball 46 at any point on the curve 55.

In order to express this equation in such a manner as to include the slope $$\frac{dy}{dx} = .026$$

it is necessary to differentiate.

$$Y = \frac{K}{X^2} = KX^{-2}$$

$$dy = -2KX^{-3}dx$$

$$\frac{dy}{dx} = \frac{-2K}{X^3}$$

$$K = \frac{\frac{dy}{dx}X^3}{-2} = \frac{.026 X^3}{-2}$$

If $X = 18.9$ then $$K = \frac{.026 \; 18.9^3}{-2} = -81.4$$

and $$Y = \frac{K}{X^2} = \frac{-81.4}{18.9^2} = 0.22+$$

Thus, using the above formula the points along the curve 55 can be determined and the table surface 5 constructed to simulate the Sun's gravitational pull on the ball 46.

Operation of the means for visually indicating flight paths of vehicles between the Earth, Venus and Mercury, is as follows:

The Mercury and Venus-representing structures 12 and 13 are caused to rotate about the orbit-representing tracks 10 and 11 at speeds corresponding to the relative travel of these two planets about the Sun. The launching track 45 is adjusted as to direction and inclination to cause the magnetic ball 46 representing a space vehicle to travel outwardly from the post 41 representing the Earth in the various directions and at the various speeds corresponding to the launching conditions of space vehicles from the Earth. The ball 46 is initially mechanically or manually held and then released at the appropriate instant which will cause the ball to follow a trajectory calculated to intersect one of the planet-representing structures 12 or 13.

Actual intersection is not required for the magnets 15 are arranged to produce magnetic fields representing the gravitational fields associated with each of the planets. Thus, if the trajectory of the ball 46 is such as to pass within the magnetic fields of the planet-representing structures 12 or 13, the ball will be drawn toward the planet-representing structure and thus deviate more or less from its normal path, depending on how close the ball passes the planet-representing structure. If the ball or space vehicle-representing member is not actually captured by the planet-representing structure, it passes to the collector channel 6 and is returned to the receptacle 8 for re-use.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

What I claim is:

Means for visually indicating flight paths of space vehicles, comprising:

(a) a magnetic ball;
(b) a table for supporting said ball and representing a portion of the planetary system including a central area representing the Sun, the surface of the table having a progressively increasing, downward slope toward the Sun-representing central area in proportion to the gravitational field of the Sun whereby said ball tends to roll toward said Sun-representing area with increasing acceleration;
(c) a drive means disposed under said table and including coaxial drive shafts extending upwardly through the central portion of the table;
(d) radiating arms disposed above said table and joined to said shafts, said arms dimensioned to correspond to the radial distances between selected planets and the Sun;
(e) planet-representing elements carried by said arms for rotation on the upper side of said table about said Sun-representing central area, said elements being magnetized to establish magnetic fields representative of the gravitational fields associated with said planets;
(f) and a launching means for said ball for initiating movement of said ball on said table at a predetermined velocity for spiral movement toward the Sun-representing area across the paths of said planet-representing elements.

References Cited by the Examiner

UNITED STATES PATENTS

| | | | |
|---|---|---|---|
| 1,314,623 | 9/19 | Wagner | 273—120 |
| 1,524,378 | 1/25 | Antes | 273—120 X |
| 1,567,251 | 12/25 | Ekstein | 273—120 |
| 2,226,032 | 12/40 | Wahlberg | 35—45 |
| 2,949,682 | 8/60 | Humbert | 35—46 |
| 2,992,512 | 7/61 | Pettit | 46—242 |
| 3,035,356 | 5/62 | Musser | 35—45 |

FOREIGN PATENTS

| | | |
|---|---|---|
| 150,331 | 2/53 | Australia. |
| 647,284 | 12/50 | Great Britain. |

EUGENE R. CAPOZIO, *Primary Examiner.*

JEROME SCHNALL, *Examiner.*